United States Patent Office 2,741,818
Patented Apr. 17, 1956

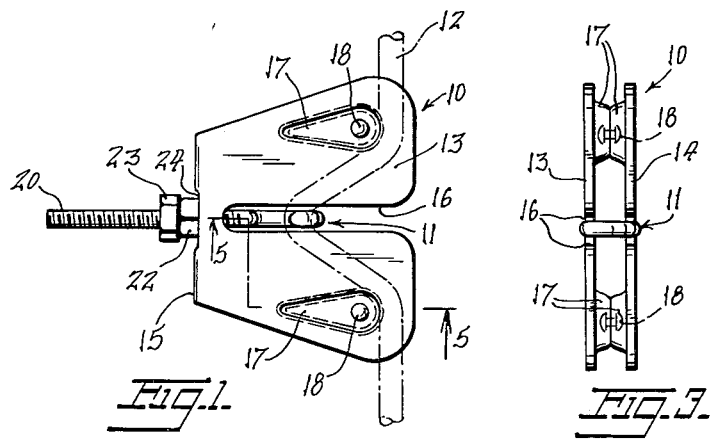
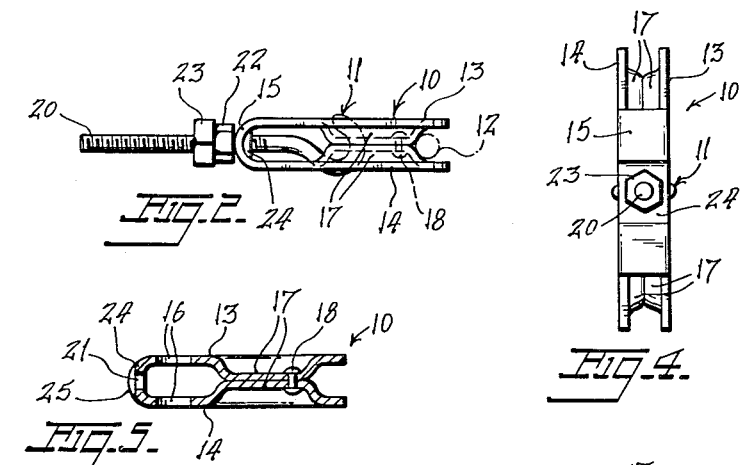
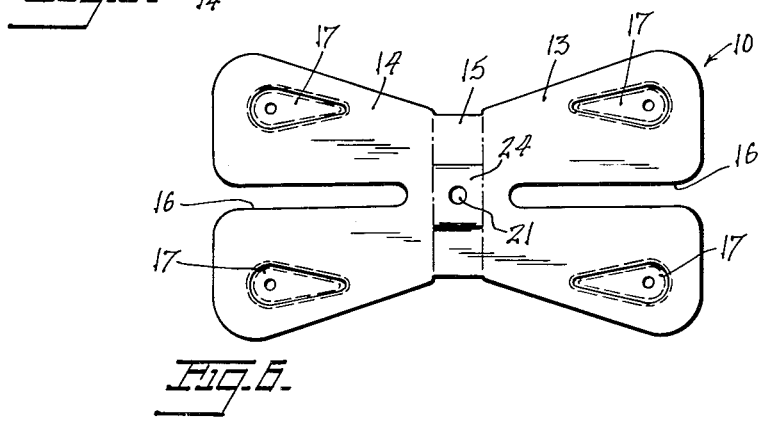

2,741,818
AUTOMOBILE BRAKE LINE SHORTENER

Irving Bader, New York, N. Y.

Application May 17, 1952, Serial No. 288,405

1 Claim. (Cl. 24—71.1)

This invention relates to a new and improved cable shortening device particularly adaptable to the shortening of the cables in automobile braking apparatus.

The principal object of the invention is the provision of a cable shortening device which is an improvement over known cable shorteners and which is capable of being manufactured at lower cost than known cable shorteners.

Another object of the invention is to provide a cable shortening device which includes a minimum number of parts and thereby to facilitate the assembly thereof.

For further comprehension of the invention and of the objects and advantages thereof, reference will be had to the following description and accompanying drawings, and to the appended claim in which the various novel features of the invention are more particularly set forth.

On the accompanying drawings forming a material part of this disclosure:

Fig. 1 is an elevational view of the cable shortener of the invention.

Fig. 2 is a plan view of the device.

Fig. 3 is an end elevation of the device as seen from the right in Fig. 1.

Fig. 4 is an end elevation of the device as seen from the left in Fig. 1.

Fig. 5 is a sectional view on line 5—5 of Fig. 1.

Fig. 6 is a plan view of the preformed blank from which the cable shortener of Figs. 1–5 is developed.

Referring now to the drawings, the cable shortener of the invention comprises a one piece housing 10 and a hook member 11 adapted to be engaged with a cable such as that indicated at 12, and to distort the engaged portion of the cable out of the straight line path normally assumed thereby. Housing 10 includes a pair of parallel side plates 13 and 14 in the form of trapezoids with their shorter parallel edges joined together by an end piece 15 formed integrally therewith. The spacing between the parallel side plates 13 and 14 is determined by the size of the cable to be shortened by the device and preferably is slightly greater than the diameter of the cable.

The two side plates 13 and 14 of housing 10 are bisected each by a slot 16 which extends from the longer parallel edge of the plate to a point a short distance from end piece 15. On either side of slot 16 the inner face of each side plate is provided with an elongated extrusion 17 formed by indenting the outer face of the plate. Preferably the extrusions 17 are located adjacent the non-parallel edges of the plates and have a semi-circular end portion adjacent the longer parallel edge of the plates. The extrusions 17 of plate 13 are located exactly opposite those of plate 14 and are in contact therewith as shown in Figs. 3, 4 and 5. In order to prevent separation of the extrusions of one plate from those of the other under stress of forces applied to their point of contact, a rivet 18 secures the semicircular ends of contacting extrusions together, see Figs. 1, 3 and 5.

The hook member 11 includes a threaded shank 20 which extends through a hole 21 at the center of end piece 15 for engagement by a nut 22 and a lock nut 23. As shown, end piece 15 is ground away surrounding hole 21 to provide a flat seat 24 for nut 22. The hooked end of hook member 11 extends between the slots 16 and preferably the latter are made just wide enough to accommodate the same.

When the device of the invention is to be applied to a cable to shorten the latter, nuts 22 and 23 are threaded out on shank 20 of hook member 11, until the hook end thereof extends beyond the ends of slots 16 a distance sufficient to permit engagement thereof with the cable. Nut 22 then is drawn up on shank 20 and the hook member draws the cable with it. On either side of the hook member the cable engages the extrusions 17 as best shown in Fig. 1, so that as the nut 22 is drawn up a V is formed in the cable and the effective length of the latter is shortened. Finally lock nut 23 is drawn up.

It is to be noted that the width of the slots 16 effectively prevents turning of the hook member 11, which might abrade or otherwise injure the cable engaged thereby.

Also to be noted is that housing 10 comprises but a single piece of metal (excluding rivets 18). This is graphically illustrated in Fig. 6. It is to be mentioned, that if desired the extrusions 17 may be replaced by rollers which, of course, would increase the production costs of the device. Further, the slots 16 may be made in a V-shape if it is not desired to prevent turning of hook member 11.

While I have illustrated and described the preferred embodiments of my invention, it is to be understood that I do not limit myself to the precise constructions herein disclosed and the right is reserved to all changes and modifications coming within the scope of the invention as defined in the appended claim.

Having thus described my invention, what I claim as new and desire to secure by United States Letters Patent is:

In a cable shortening device, the combination of parallel side plates in spaced relation to each other and secured to each other by an end piece, openings forming aligned narrow slots extending from one edge of the side plates thereof almost to the end piece, said parallel side plates having connected aligned extrusions extending from the inner parallel faces of said plates at both sides of said slots to form surfaces over which a cable rides, an aperture in said end piece in alignment with said slots, a member in said aperture including a threaded shank which is longer than the length of said slots, said threaded shank having a hooked end which is wider than the distance between the parallel side plates, said hooked end extending between said slots to receive the cable, said aligned slots forming a guideway for said hooked end, the side walls defined by said slots serving as stops to prevent turning of the hooked end thereby eliminating abrasion of the cable, the threaded shank having a nut threaded on the outer end thereof to adjust the threaded shank and hooked end and thereby the length of the cable.

References Cited in the file of this patent

UNITED STATES PATENTS

| | | |
|---|---|---|
| 2,285,791 | Auslander | June 9, 1942 |
| 2,473,363 | Cook et al. | June 14, 1949 |
| 2,510,622 | Denis | June 6, 1950 |
| 2,571,592 | Lundstrom | Oct. 16, 1951 |